United States Patent [19]
Osato

[11] Patent Number: 5,265,073
[45] Date of Patent: Nov. 23, 1993

[54] OVERWRITABLE MAGNETO-OPTICAL RECORDING MEDIUM HAVING TWO-LAYER MAGNETIC FILMS WHEREIN ONE OF THE FILMS CONTAINS ONE OR MORE OF CU, AG, TI, MN, B, PT, SI, GE, CR AND AL, AND A METHOD OF RECORDING ON THE SAME

[75] Inventor: Yoichi Osato, Yokohama, Japan
[73] Assignee: Canon Kabushiki Kaisha, Tokyo, Japan
[21] Appl. No.: 693,067
[22] Filed: May 1, 1991

Related U.S. Application Data

[63] Continuation of Ser. No. 617,432, Nov. 23, 1990, abandoned, which is a continuation of Ser. No. 368,889, Jun. 21, 1989, abandoned, which is a continuation of Ser. No. 162,952, Mar. 2, 1988, abandoned.

[30] Foreign Application Priority Data

Mar. 13, 1987 [JP] Japan ................. 62-56718
Mar. 13, 1987 [JP] Japan ................. 62-56719

[51] Int. Cl.$^5$ ............ G11B 13/04; G11B 11/12; G11B 11/10
[52] U.S. Cl. .................. 369/13; 360/59; 365/122; 428/694 R
[58] Field of Search ........ 269/13; 360/59, 114; 365/122; 428/694, 900

[56] References Cited

U.S. PATENT DOCUMENTS

| | | | |
|---|---|---|---|
| 3,488,167 | 1/1970 | Chang | 365/122 X |
| 4,103,315 | 7/1978 | Hempstead | 360/110 |
| 4,559,573 | 12/1985 | Tanaka | 360/131 |
| 4,612,587 | 9/1986 | Kaneko et al. | 369/13 |
| 4,645,722 | 2/1987 | Katayama et al. | 428/694 |
| 4,693,943 | 9/1987 | Kishi et al. | 428/900 |
| 4,701,881 | 10/1987 | Tanaka et al. | 360/135 |
| 4,710,434 | 12/1987 | Sato et al. | 428/694 |
| 4,753,853 | 6/1988 | Sato et al. | 428/694 |
| 4,771,347 | 9/1988 | Horimai et al. | 369/13 |
| 4,799,114 | 1/1989 | Tsunashima | 360/135 |
| 4,803,129 | 2/1989 | Noriai et al. | 428/900 |
| 4,955,007 | 9/1990 | Aratani et al. | 360/114 |

FOREIGN PATENT DOCUMENTS

| | | | |
|---|---|---|---|
| 0258978 | 3/1988 | European Pat. Off. | 369/13 |
| 3619618 | 12/1986 | Fed. Rep. of Germany | 369/13 |
| 57-78653 | 5/1982 | Japan | 369/13 |
| 61-255546 | 11/1986 | Japan | 360/114 |
| 62-175948 | 8/1987 | Japan | 369/13 |

OTHER PUBLICATIONS

Tsunashima et al, "*Thermomagnetic Writing On Exchange-Coupled Amorphous Rare Earth Iron Double Layer Films*", IEE Transactions on Magnetics, vol. Mag. 17, No. 16, Nov./1981, pp. 2840-2842.
Kobayashi et al, "*Mag. Process of Exchange-Coupled Ferr. Double-Layered Films*", Japanese Journal of Applied Physics, vol. 20, No. 11, Nov./1981, pp. 2089-2095.
Japanese Pat. Abs., vol. 10, No. 34 (1986) p. 427.
Kobayashi Japanese Journal Applied Physics, vol. 20, No. 11 (1981) 2089:95.
Berkowitz, IEE Trans. Mag., vol. 11, No. 4 (1975) 996:1017.
Salansky, IEE Trans. Mag., vol. 10, No. 4 (1974) 1033:38.

*Primary Examiner*—Hoa T. Nguyen
*Attorney, Agent, or Firm*—Fitzpatrick, Cella, Harper & Scinto

[57] ABSTRACT

A magneto-optical recording medium having a first magnetic layer and a second magnetic layer having a higher curie point and a lower coercive force than those of the first magnetic layer, which magneto-optical recording medium satisfying a condition of $$H_H > H_L > \frac{\sigma_w}{2M_s h}$$

where $H_H$ is a coercive force of the first magnetic layer, $H_L$ is a coercive force of the second magnetic layer. $M_s$ is a saturation magnetization of the second magnetic layer, h is a film thickness of the second magnetic layer, and $\sigma_w$ is a magnetic wall energy between the first and second magnetic layers. The second magnetic layer contains an element which is not ferromagnetic at a room temperature. A magnetic field opposite in direction to the field of the first layer is applied to the second layer. A recording method is also present using such medium.

20 Claims, 2 Drawing Sheets

5,265,073

OVERWRITABLE MAGNETO-OPTICAL RECORDING MEDIUM HAVING TWO-LAYER MAGNETIC FILMS WHEREIN ONE OF THE FILMS CONTAINS ONE OR MORE OF CU, AG, TI, MN, B, PT, SI, GE, CR AND AL, AND A METHOD OF RECORDING ON THE SAME

This application is a continuation of application Ser. No. 617,432, filed Nov. 23, 1990 now abandoned, which is a continuation of application Ser. No. 368,889, filed Jun. 21, 1989, now abandoned, which was a continuation of application Ser. No. 162,952, filed Mar. 2, 1988, now abandoned.

BACKGROUND OF THE INVENTION

1. Field of the Invention

The present invention relates to magneto-optical recording medium having a recording layer of two-layer magnetic film for recording information by radiation of light beam, and recording method using the same.

2. Related Background Art

Research and development of an optical memory element which uses a laser beam to realize a high density and large capacity memory have been rapidly done. Among others, a magneto-optical recording medium is advisable as a rewritable optical memory element.

However, when information recorded on such a magneto-optical recording medium is to be rewritten, the information should be erased and then new information should be recorded. Namely, overwriting of information cannot be attained. For example, when information on a predetermined track on a magneto-optical disk is to be rewritten, the information on the track is erased in one revolution of the disk and then new information is written in the next revolution. As a result, a recording speed is low.

In order to solve the above problem, separate record-/reproduce head and erase head are provided in the prior art apparatus, or information is recorded while a magnetic field applied with a continuous laser beam is modulated. However, such an apparatus is of large scale and high cost or cannot attain high speed modulation.

On the other hand, Japanese Laid-Open Patent Application No. 175948/1987 (corresponding to DE-OS No. 3,619,618) discloses magneto-optical recording medium and recording method using the same which enable overwriting like a magnetic recording medium by providing simple magnetic field generation means in the conventional apparatus.

However, since this recording method is novel, there remain many problems to be further studied. One example is study of a magneto-optical recording medium which is better suited to such a recording method.

SUMMARY OF THE INVENTION

It is an object of the present invention to improve the technique disclosed in the above patent application and provide magneto-optical recording medium which is better suited to overwriting and recording method using the same.

The above object of the present invention is attained by a magneto-optical recording medium having a first magnetic layer and a second magnetic layer having a higher curie point and a lower coercive force than those of the first magnetic layer, which magneto-optical recording medium satisfying a condition of $$H_H > H_L > \frac{\sigma_w}{2M_s h}$$

where $H_H$ is a coercive force of the first magnetic layer, $H_L$ is a coercive force of the second magnetic layer. $M_s$ is a saturation magnetization of the second magnetic layer, h is a film thickness of the second magnetic layer, and $\sigma_w$ is a magnetic wall energy between the first and second magnetic layers. The second magnetic layer contains an element which is not ferromagnetic at a room temperature. A magnetic field opposite in direction to the field of the first layer is applied to the second layer.

A recording method using such a medium comprises the steps of:

(a) applying a first magnetic field large enough to magnetize the second magnetic layer in one direction but not large enough to reverse magnetization of the first magnetic layer, and (b) selectively effecting a first type of recording or a second type of recording depending on an information signal;

in the first type of recording, a light beam having a power large enough to heat the medium to a vicinity of a curie point of the first magnetic layer being irradiated while a bias of the opposite direction to the first magnetic field is applied so that the magnetization of the first magnetic layer is changed to a direction stable to the second magnetic layer while the direction of magnetization of the second magnetic layer is kept unchanged;

in the second type of recording, a light beam having a power large enough to heat the medium to a vicinity of a curie point of the second magnetic layer being irradiated so that the magnetization of the second magnetic layer is reversed and the first magnetic layer is magnetized in a direction stable to the second magnetic layer.

DETAILED DESCRIPTION OF THE PREFERRED EMBODIMENTS

Figure 1:
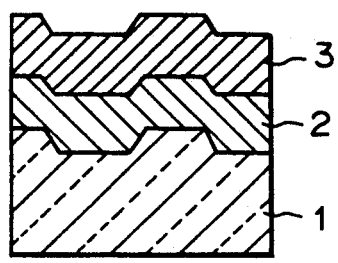
FIG. 1 shows a sectional view of one embodiment of a magneto-optical recording medium of the present invention.
Figure 2:
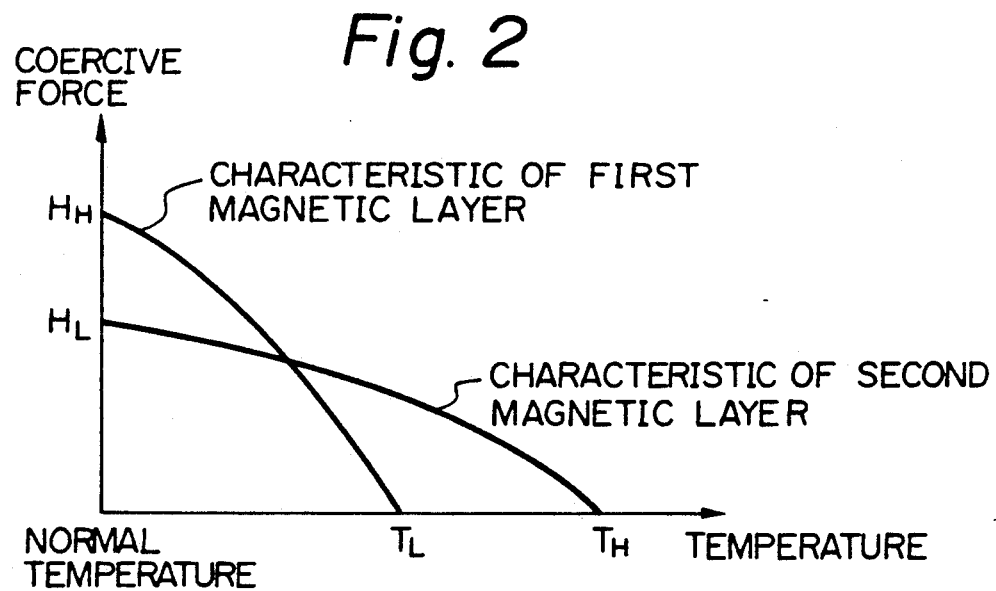
FIG. 2 shows a temperature characteristics of coercive forces of magnetic layers of the medium shown in FIG. 1.

FIG. 1 shows a sectional view of one embodiment of the magneto-optical recording medium of the present invention. The magneto-optical recording medium of FIG. 1 has a first magnetic layer 2 and a second magnetic layer 3 laminated on a pre-grooved transparent substrate 1. The first magnetic layer 2 has a low curie point 3 and a high coercive force $H_H$, and the second magnetic layer 3 has a high curie point $T_H$ and a low coercive force $H_L$. The terms high and low mean relative relations when both magnetic layers are compared. (The coercive forces are compared at a room temperature.) The relations are shown in FIG. 2. Usually, $T_L$ and $H_H$ of the first magnetic layer 2 are selected to 70°–180° C. and 3–10K Oe, respectively, and $T_H$ and $H_L$ of the second magnetic layer are selected to 100°–400° C. and 0.5–2K Oe, respectively.

A principal composition of each of the magnetic layers is amorphous magnetic alloy of a rare earth element and a transition metal element which exhibits perpendicular magnetic anisotropy and magneto-optical effect. Examples are GdCo, GdFe, TbFe, DyFe, GdTbFe, TbDyFe, GeTbFeCo, TbFeCo and GdTbCo, etc.

In a recording method which uses the magneto-optical recording medium of the present invention, the first magnetic layer 2 primarily contributes to the reproduction. Namely, the magneto optical effect exhibited by the first magnetic layer 2 is primarily utilized for the reproduction, and the second magnetic layer 3 plays an important role in recording information.

In the two-layer film of the recording medium of the present invention, the following relation must be met:

$$H_H > H_L > \frac{\sigma_w}{2M_s h}$$

where $M_s$ is a saturation magnetization of the second magnetic layer 3, h is a thickness of the second magnetic layer 3, and $\sigma_w$ is a magnetic wall energy between the two magnetic layers.

The above relation should be met in order for magnetization of bits at the end of recording (shown by 4f in FIG. 3) to exist stably.

The thicknesses, coercive forces, saturation magnetization of the magnetic layers (perpendicular magnetization layers) 2 and 3 and the magnetic wall energy may be appropriately selected to meet the above relation. Practically and specifically, the solution magnetization $M_s$ of the second magnetic layer is selected to be large, the film thickness h thereof is selected to be large or the magnetic wall energy $\sigma_w$ is selected to be small. However, when film thickness h is large, a sensitivity of the magneto-optical recording medium is lowered. Further, when the saturation magnetization is large, the coercive force $H_L$ is lowered. Experimentarily, when $H_L$ is lower than 1K Oe, it tends to be $H_L < \sigma_w/2M_s h$.

Accordingly, the best practical way is to reduce the magnetic wall energy $\sigma_w$. For example, when an intermediate layer of a non-magnetic element is provided between the first magnetic layer 2 and the second magnetic layer 3, an exchange coaction through the intermediate layer is substantially reduced even if it is only of several tens Å thickness, and an apparent $\sigma_w$ is lowered.

However, in actual, a magneto-optical recording medium having an appropriate $\sigma_w$ cannot be prepared with high reproducibility.

In the experiment done by the inventor of the present invention, a non-magnetic element was added to the second magnetic layer. It was found that since the material which reduced the exchange coaction was dispersed in the layer, the exchange force acting on the second magnetic layer through the magnetic walls of the first and second magnetic layers was reduced as it was by the intermediate layer and that the exchange force acting on the second magnetic layer could be set with high reproducibility unlike the case where the intermediate layer was used.

The non-magnetic element may be one which hardly affects to $M_s$ of the second magnetic layer when it is added thereto (that is, hardly lowers $M_s$ and curie point). Examples are one or more of Cu, Ag, Ti, Mn, B, Pt, Si and etc. Amount of addition is preferably 2–70 atomic % to the second magnetic layer, and more preferably 5–20 atomic %. The drop of the curie point due to the addition of the non-magnetic element is preferably held within 30° C.

The drop of the curie point is considered to be caused primarily by alloying of the added non-magnetic element and the rare earth element or transition metal of the second magnetic layer. Further, study was done to prevent such drop and it was found effective to separately provide an evaporation source for the rare earth element or transition metal element and an evaporation source for the non-magnetic element in forming the second magnetic layer and form the layer by a conventional sputtering method, ion beam vapor deposition or sputtering method, electron beam evaporation deposition method, or cluster beam evaporation deposition method while the substrate is rotated. With this method, the drop of the curie point is small even if a large amount of non-magnetic element is added, and the apparent $\sigma_w$ can be reduced without adverse effect by the reduction of $M_s$, that is, adverse effects to the record sensitivities and record status of the first and second magnetic layers. The reason therefor is considered that a laminated structure of the rare earth-transition metal element and the non-magnetic element is formed when viewed microscopically.

The magnetic layers 2 and 3 are preferably exchange-coupled while taking a magnitude of an effective biasing magnetic field in a recording step and stability of binary record bits into account.

Figure 3:
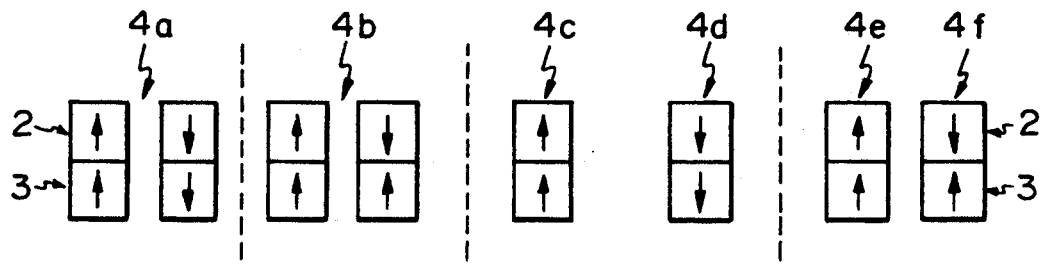
FIG. 3 shows magnetization status in a recording step using the medium of FIG. 1.
Figure 4:
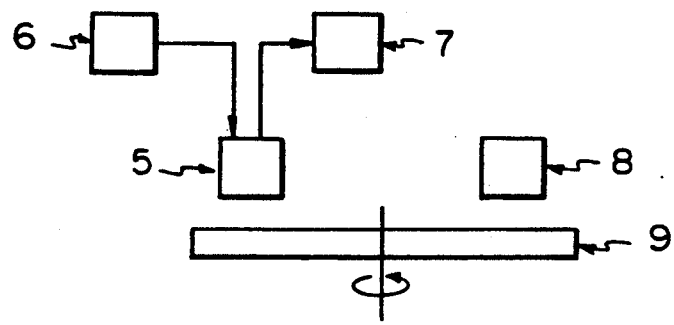
FIG. 4 shows a conceptual view of a recording and reproducing apparatus which uses the medium of FIG. 1.

The recording method using the magneto-optical recording medium of the present invention is explained with reference to FIGS. 2 to 4. FIG. 3 shows directions of magnetizations of the magnetic layers 2 and 3 in the recording step, and FIG. 4 shows a block diagram of the recording apparatus. Before recording, the stable directions of magnetizations of the magnetic layers 2 and 3 may be either parallel (same direction) or anti-parallel (opposite directions). In FIG. 3, the stable directions of magnetizations are parallel.

In FIG. 4, numeral 9 denotes a magneto-optical disk having the above construction. It is assumed that initial magnetization of a portion of the magnetic layers is that shown by 4a in FIG. 3. The magneto-optical disk 9 is rotated by a spindle motor and passes through a magnetic field generation unit 8. If magnitude of the magnetic field of the magnetic field generation unit 8 is set between the coercive forces of the magnetic layers 2 and 3 (the direction of the magnetic field is upward in the present embodiment), the second magnetic layer 3 is magnetized in a uniform direction as shown by 4b in FIG. 3 while the magnetization of the first magnetic layer 2 is kept unchanged.

When the magneto-optical disk 9 rotates and passes through a record/reproduce head 5, a laser beam of one of two laser powers is irradiated to the disk plane in accordance with a signal from a record signal generator 6. The first laser power is large enough to heat the disk to a vicinity of the curie point of first magnetic layer 2, and the second laser power is large enough to heat the disk to a vicinity of the curie point of the second magnetic layer. In FIG. 2 which shows the relation between the coercive forces of the magnetic layers 2 and 3 and a temperature, the first laser power can heat the disk to the vicinity of $T_L$ and the second laser power can heat the disk to the vicinity of $T_H$.

The first magnetic layer 2 is heated by the first laser power to the vicinity of the curie point. Since the second magnetic layer 3 has a coercive force at this temperature which allows stable existence of bits, the bits shown by 4c in FIG. 3 are formed from 4b of FIG. 3 by properly setting a recording biasing magnetic field.

First Preliminary Recording

The proper setting of the biasing magnetic field is explained below. In the first preliminary recording, a force (exchange force) to arrange the magnetization of the first magnetic layer 2 is applied in a direction stable to the magnetization of the second magnetic layer 3 (the same direction in the present embodiment) and hence the biasing magnetic field is not necessary in principle. However, in preliminary recording which uses the second laser power, the biasing magnetic field is not in a direction to assist the reversal of magnetization of the second magnetic layer 3 (the direction to impede the first preliminary recording). It is advisable that the magnitudes and directions of the biasing magnetic fields in the preliminary recordings by the first and second laser powers are same.

In view of the above, it is advisable that the biasing magnetic field is set to a minimum level required for the preliminary recording by the second laser power by the following principle. The proper setting of the biasing magnetic field is done while taking those factors into consideration.

The second preliminary recording is explained. When the disk is heated by the second laser power to the vicinity of the curie point of the second magnetic layer 3 (second preliminary recording), the magnetization of the second magnetic layer 3 is reversed by the biasing magnetic field which has been set in the manner described above. Then, the magnetization of the first magnetic layer 2 is arranged in a direction stable to the second magnetic layer 3 (the same direction in the present embodiment). The bits shown by 4d in FIG. 3 are formed from 4b of FIG. 3.

In this manner, each area of the magneto-optical disk is preliminarily recorded into the state 4c or 4d of FIG. 3 by the biasing magnetic field and the first or second laser power selected in accordance with the signal.

As the magneto-optical disk 9 is rotated so that the bits 4c and 4d of the preliminary recording again pass through the magnetic field generation unit 8, the recorded bits 4c do not change because the magnetude of the magnetic field of the magnetic field generation unit 8 has been set between the coercive forces of the magnetic layers 2 and 3. (Final record status). On the other hand, the recorded bits 4d are changed to 4f because the magnetization of the second magnetic layer 3 is reversed. (another final record status).

In order for the recorded bit status of 4f to exist stably, the following relation should be met.

$$\frac{\sigma_w}{2M_s h} < H_L < H_H$$

where $M_s$ is the magnitude of saturation magnetization of the second magnetic layer 3, h is the thickness thereof, $\sigma_w$ is the magnetic wall energy between the magnetic layers 2 and 3, and $\sigma_w/2M_s h$ is a strength of the exchange force acting on the second magnetic layer. The magnetic field having the magnitude of $\sigma_w/2M_s h$ tends to change the direction of the second magnetic layer 3 to the direction stable to the magnetization of the first magnetization layer 2 (the same direction in the present embodiment). In order for the magnetization of the second magnetic layer 3 not to be reversed by this magnetic field, the coercive force $H_L$ of the second magnetic layer 3 should meet the relation of $H_L > \sigma_w/2M_s h$.

Since the recorded bit status 4e and 4f are controlled by the laser power in the recording step and do not depend on the status prior to the recording, the overwriting can be attained. The recorded bits 4e and 4f can be reproduced by irradiating a reproducing laser beam and processing a reproduced light by a record signal reproducing unit 7.

Figure 5:
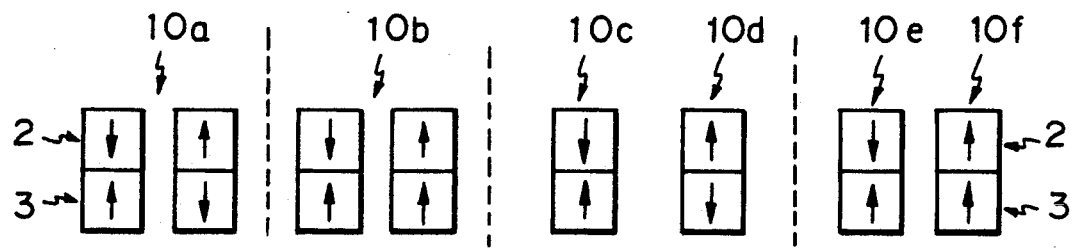
FIG. 5 shows magnetization status in a recording step when another embodiment of recording medium is used.

In the embodiment of FIG. 3, the magnetization is stable when the directions of magnetization of the first magnetic layer 2 and the second magnetic layer 3 are same. A magnetic layer whose magnetization is stable when the magnetizations of the first and second magnetization layers are anti-parallel may also be used. FIG. 5 shows magnetization status in the recording step of such a magnetic medium. In FIG. 5, 10a–10f correspond to 4a–4f of FIG. 3.

Figure 6:
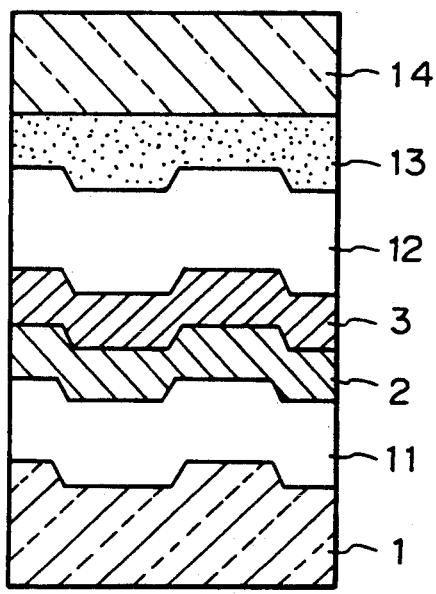
FIG. 6 shows a sectional view of other embodiment of a magneto-optical recording medium of the present invention which has a protection layer.

FIG. 6 shows a sectional view of another embodiment of the magneto-optical recording medium of the present invention. In FIG. 6, the like elements to those shown in FIG. 1 are designated by the like numerals and the explanation thereof is omitted. A protection layer 11 is provided between the substrate 1 and the first magnetic layer 2. Another protection layer 12 is provided on the second magnetic layer 3. A bonding substrate 14 is bonded thereto through an adhesive layer 13. This arrangement improves an anti-corrosion property of the medium. The protection layers preferably have a thickness of 200 Å or more. Material of the protection layers is fine non-magnetic material which is usually inorganic dielectric material such as $Si_3N_4$, SiC, ZnS, AlN, SiO, $Al_2O_3$, $Cr_2O_3$, Si or Ge etc.

EXAMPLE 1

A pregrooved and preformatted polycarbonate disk-shaped substrate was set in a sputtering device having three target sources with a distance to the target being set to 10 cm, and the substrate was rotated.

Air in the sputtering device was evacuated to $1 \times 10^{-6}$ Torr or lower, and a ZnS protection layer was formed to a thickness of 1000 Å by the first target in argon at a sputtering rate of 100 Å/min and a sputtering pressure of $5 \times 10^{-3}$ Torr. Then, a TbFe alloy was sputtered in argon by the second target at a sputtering rate of 100 Å/min and a sputtering pressure of $5 \times 10^{-3}$ Torr to form a first magnetic layer having a film thickness of 300 Å, $T_L$ of approximately 140° C. and $H_H$ of approximately 10 KOe and composition of $Tb_{18}Fe_{82}$ with Fe element sub-lattice magnetization preference.

Then, a TbFeCuCo alloy was sputtered in argon at a sputtering pressure of $5 \times 10^{-3}$ Torr to form a second magnetic layer having a film thickness of 500 Å, $T_H$ of approximately 200° C. and $H_L$ of approximately 1 KOe and composition of $Tb_{18.4}Fe_{56}Co_{5.6}Cu_{20}$ with Tb element sub-lattice magnetization preference.

Then, a ZnS protection layer having a thickness of 3000 Å was formed in argon by the first target at a sputtering rate of 100 Å/min and a sputtering pressure of $5 \times 10^{-3}$ Torr.

Then, the substrate was bonded to a polycarbonate bonding substrate by hot melt adhesive material to complete a sample of the magneto-optical disk.

The magneto-optical disk was loaded to a recording and reproducing apparatus and rotated past a magnetic field generation unit of 2.5K Oe at a linear speed of approximately 8 m/sec and information was recorded by laser powers of 4 mW and 8 mW while the laser beam having a wavelength of 830 nm focused to approximately 1 μm was modulated at 2 MHz with a duty factor of 50%. The biasing magnetic field was at 100 Oe. Then, the information was reproduced by irradiating a laser beam of 1.5 mW to reproduce a binary signal.

The same experiment was done for the magneto-optical disk having information recorded on the entire surface. The signal component of the previously recorded signal was not detected and the overwriting was attained.

EXAMPLE 2 AND COMPARATIVE EXAMPLE

A sample of magneto-optical disk having the same composition, film thicknesses and coercive forces as those of the Example 1 was formed in the same manner as that of the Example 1 except for the type and amount of the non-magnetic element to be added to the second magnetic layer being changed as shown in Table 1.

In order to examine the stability of the recorded bits 4f of FIG. 3 for the samples including that of the Example 1, the magnitude of the magnetic field at which the magnetizations of the first and second magnetic layers are reversed were checked while the external magnetic field was applied. Then, the stability of the recorded bits 4f without application of the external magnetic field was examined. In Table 1, ○ indicates stable and x indicate not stable.

For each of the samples shown in Table 1, only the film thickness of the second magnetic layer was changed to prepare a new sample, and the film thickness of the second magnetic layer at which the recorded bits 45 started to be unstable was checked. The results are shown in Table 1.

TABLE 1

| Sample | Element added to second magnetic layer | Composition of second magnetic layer | Stability of bits 4f | Film thickness (Å) at which instability starts |
|---|---|---|---|---|
| Example 1 | Cu | $Tb_{18.4}Fe_{54.6}Co_7Cu_{20}$ | ○ | 200 |
| Comparative example | None | $Tb_{23}Fe_{70}Co_7$ | ○ | 450 |
| Example 2-1 | Cu | $Tb_{22}Fe_{66}Co_7Cu_5$ | ○ | 300 |
| 2-2 | Cu | $Tb_{21}Fe_{62}Co_7Cu_{10}$ | ○ | 250 |
| 2-3 | Ag | $Tb_{18.4}Fe_{54.6}Co_7Ag_{20}$ | ○ | 250 |
| 2-4 | Ag | $Tb_{21}Fe_{62}Co_7Ag_{10}$ | ○ | 300 |
| 2-5 | Ag | $Tb_{22}Fe_{66}Co_7Ag_5$ | ○ | 370 |
| 2-6 | Ti | $Gd_{12}Tb_{10}Fe_{61}Co_7Ti_{10}$ | ○ | 330 |
| 2-7 | Ti | $Gd_{12}Tb_{11}Fe_{65}Co_7Ti_5$ | ○ | 400 |
| 2-8 | Si | $Tb_{21}Fe_{62}Co_7Si_{10}$ | ○ | 300 |
| 2-9 | Si | $Tb_{22}Fe_{66}Co_7Si_5$ | ○ | 370 |
| Example 2-10 | Mn | $Tb_{22}Fe_{66}Co_7Mn_5$ | ○ | 380 |
| 2-11 | B | $Tb_{22}Fe_{66}Co_7B_5$ | ○ | 360 |
| 2-12 | Pt | $Tb_{22}Fe_{66}Co_7Pt_5$ | ○ | 380 |
| 2-13 | Ge | $Tb_{21}Fe_{66}Co_7Ge_{10}$ | ○ | 330 |
| 2-14 | Al | $Tb_{22}Fe_{66}Co_7Al_5$ | ○ | 380 |
| 2-15 | Cr | $Tb_{22}Fe_{66}Co_7Cr_5$ | ○ | 380 |

It is seen from Table 1 that in each of the samples in which the non-magnetic element was added to the second magnetic layer, the stability of the bits 4f is improved over that of the comparative example in which no such element was added. As a result, the film thickness of the second magnetic layer can be set to a small thickness and the recording sensitivity is improved.

EXAMPLE 3

A pregrooved and preformatted polycarbonate disk-shaped substrate was set in a sputtering device having three target sources with a distance to the target being set to 10 cm, and it was rotated at 15 rpm.

Air in the sputtering device was evacuated to $1 \times 10^{-6}$ Torr or less, and a ZnS protection layer was formed to a thickness of 1000 Å in argon by the first target at a sputtering rate of 100 Å/min and a sputtering pressure of $5 \times 10^{-3}$ Torr. Then, a TbFe alloy was sputtered in argon by the second target at a sputtering rate of 100 Å/min and a sputtering pressure of $5 \times 10^{-3}$ Torr to form a first magnetic layer having a film thickness of 300 Å, $T_L$ of approximately 140° C. and $H_H$ of approximately 10K Oe and having composition of $Tb_{18}Fe_{82}$ with Fe element sub-lattice magnetization preference.

Then, a TbFeCo alloy was sputtered in argon by the third target at a sputtering pressure of $5 \times 10^{-3}$ Torr and Cu was simultaneously sputtered by the fourth target at a sputtering rate of 100 Å/min to form a second magnetic layer having a film thickness of 500 Å, $T_H$ of approximately 200° C. and $H_L$ of approximately 1K Oe and having composition of $Tb_{18.4}Fe_{56}Co_{5.6}Cu_{20}$ with Tb element sub-lattice magnetization preference.

Then, a ZnS protection layer was formed to a thickness of 2000 Å in argon by the first target at a sputtering rate of 100 Å/min and a sputtering pressure of $5 \times 10^{-3}$ Torr.

Then, the substrate was bounded to a polycarbonate bonding substrate by hot melt adhesive material to complete a sample of the magneto-optical disk.

The sample was loaded to the recording and reproducing apparatus and the magnetic field generation unit of 2.5K Oe was moved at a linear velocity of approximately 8 m/sec, and information was recorded by laser powers of 4 mW and 8 mW while the laser beam having a wavelength of 830 nm focused to approximately 1 μ was modulated at 2 MHz with a duty factor of 50%. The biasing magnetic field was at 100 Oe. Then, a laser beam of 1.5 mW was irradiated to reproduce a binary signal.

The same experiment was done for the magneto-optical disk having information recorded on the entire surface. The previously recorded signal component was not detected and the overwriting was attained.

EXAMPLE 4

Samples of the magneto-optical disk having the same material, film thickness and coercive forces as those of the Example 3 were formed in the same manner as that of the Example 3 except for the types and amounts of non-magnetic elements to be added, the rotation speed of the substrate when the films are formed, and further except that the second magnetic layer was formed by one target for comparison purpose.

In order to examine the stability of the recorded bits $4f$ of FIG. 3 for each of the samples including the Example 3, the magnitude of the magnetic field at which the magnetizations of the first and second magnetic layers are reversed was checked under the application of an external magnetic field. Then, the stability of the recorded bits $4f$ without application of the external magnetic field was examined. In Table 2, ○ indicates stable and x indicates not stable.

For each of the sample shown in Table 2, only the film thickness of the second magnetic layer was changed to prepare a new sample, and the film thickness of the second magnetic layer at which the recorded bits $4f$ started to be unstable was checked. The results are shown in Table 2.

present invention covers all of such applications without departing from the scope of claim.

What is claimed is:

1. A magneto-optical recording medium having a first magnetic layer and a second magnetic layer having a higher curie point and a lower coercive force than those of said first magnetic layer, said recording medium satisfying a condition of $$H_H > H_L > \frac{\sigma_w}{2M_s h}$$

where $H_H$ is a coercive force of said first magnetic layer, $H_L$ is a coercive force of said second magnetic layer, $M_s$ is a saturation magnetization of said second magnetic layer, h is a thickness of said second magnetic layer and $\sigma_w$ is a magnetic wall energy between said first magnetic layer and said second magnetic layer, and only said second magnetic layer of said first and second magnetic layer containing an element which does not exhibit ferromagnetic property at room temperature; and said first and second magnetic layers being mainly composed of a rare earth-transition metal amorphous alloy.

2. A magneto-optical recording medium according to claim 1 wherein said element is one of more of element selected from a group consisting of Cu, Ag, Ti, Mn, B, Pt, Si, Ge, Cr and Al.

3. A magneto-optical recording medium according to claim 2 wherein amount of said element is 2–70 atomic % to that of said second magnetic layer.

4. A magneto-optical recording medium according to claim 3 wherein amount of said element is 5–20 atomic % to that of said second magnetic layer.

TABLE 2

| Sample | Element added to second magnetic layer | Composition of second magnetic layer | Sputter sources of second magnetic layer | Rotation speed of substrate | Stability of bits 4f | Film thickness at which unstability starts (Å) | Curie point (°C.) |
|---|---|---|---|---|---|---|---|
| Example 3 | Cu | $Tb_{18.4}Fe_{54.6}Co_7Cu_{20}$ | 2 | 15 rpm. | ○ | 300 | 200 |
| 4-1 | ↓ | ↓ | 1 | 15 rpm | ○ | 300 | 190 |
| 4-2 | ↓ | ↓ | 2 | 50 rpm | ○ | 300 | 195 |
| 4-3 | Ti | $Tb_{19}Fe_{52}Co_9Ti_{20}$ | 2 | 15 rpm. | ○ | 350 | 200 |
| 4-4 | ↓ | ↓ | 1 | ↓ | x | — | 160 |
| 4-5 | ↓ | $Tb_{19}Fe_{64}Co_7Ti_{10}$ | 2 | ↓ | ○ | 350 | 190 |
| 4-6 | ↓ | ↓ | 1 | ↓ | ○ | 400 | 180 |
| 4-7 | Cr | $Tb_{19}Fe_{41}Co_{20}Cr_{20}$ | 2 | ↓ | ○ | 350 | 190 |
| 4-8 | ↓ | ↓ | 1 | ↓ | x | — | 165 |
| 4-9 | ↓ | $Tb_{19}Fe_{61}Co_{10}Cr_{10}$ | 2 | ↓ | ○ | 350 | 190 |
| 4-10 | ↓ | ↓ | 1 | ↓ | ○ | 500 | 175 |
| Example 4-11 | Al | $Tb_{18.5}Fe_{49.5}Co_{12}Al_{20}$ | 2 | 15 rpm. | ○ | 350 | 190 |
| 4-12 | ↓ | ↓ | 1 | ↓ | x | — | 160 |
| 4-13 | ↓ | $Tb_{18.5}Fe_{62.5}Co_9Al_{10}$ | 2 | ↓ | ○ | 350 | 190 |
| 4-14 | ↓ | ↓ | 1 | ↓ | ○ | 500 | 185 |

It is seen from Table 2 that in the samples prepared by separate evaporation sources (sputtering sources) for the second magnetic layer for the magnetic material and the non-magnetic material, the drop of the Curie point is small and the stability of the bits $4f$ is high.

In the samples 4—4, 4-8 and 4-12, the stabilities of bits $4f$ are x because the coercive force of the second magnetic layer was lowered. The effect of separation of the evaporation sources is remarkable for the material such as Cr or Al which can greatly lower the curie point when it is added to the transition metal.

The present invention can be applied in various ways other than those shown in the embodiments, and the 5. A magneto-optical recording medium according to claim 1 wherein said first magnetic layer and said second magnetic layer each is an alloy of a rare earth element and a transition metal.

6. A magneto-optical recording medium according to claim 5 wherein said first magnetic layer and said second magnetic layer each is an alloy selected from a group consisting of GdCo, GdFe, TbFe, DyFe, GdTbFe, TbDyFe, GdTbFeCo, TbFeCo and GdTbCo.

7. A magneto-optical recording medium according to claim 5 wherein said second magnetic layer is formed by simultaneously evaporation depositing rare earth element-transition metal material and non-magnetic element material from separately spaced evaporation sources.

8. A magneto-optical recording medium according to claim 1 wherein said first magnetic layer has a curie point of 70°–180° C. and said second magnetic layer has a curie point of 100°–400° C.

9. A magneto-optical recording medium according to claim 1 wherein said first magnetic layer has a coercive force of 3–10K Oe, and said second magnetic layer has a coercive force of 0.5–2K Oe.

10. A recording method comprising the steps of:
(a) using a magneto-optical recording medium having a first magnetic layer and a second magnetic layer exchange-coupled to said first magnetic layer, said second magnetic layer having a higher curie point and a lower coercive force than those of said first magnetic layer,
said recording medium satisfying a condition of $$H_H > H_L > \sigma_w/2M_s h$$

where
$H_H$ is a coercive force of said first magnetic layer,
$H_L$ is a coercive force of said second magnetic layer,
$M_s$ is a saturation magnetization of second magnetic layer,
h is a thickness of said second magnetic layer and
$\sigma_w$ is a magnetic wall energy between said first magnetic layer and said second magnetic layer, and
only said second magnetic layer of said first and second magnetic layers containing an element which does not exhibit ferromagnetic property at room temperature and which effects reducing exchange force acting on the second magnetic layer through magnetic walls by the first and second magnetic layers;
said first and second magnetic layers being mainly composed of a rare earth-transition metal amorphous alloy,
(b) applying a first magnetic field large enough to magnetize said second magnetic layer in one direction but not large enough to effect reverse magnetization of said first magnetic layer, and
(c) selectively effecting a first type of recording or a second type of recording depending on an information signal;
in said first type of recording, a light beam having a power large enough to heat said recording medium to a vicinity of a curie point of said first magnetic layer being irradiated while a second magnetic field as a bias magnetic field is applied so that the magnetization of said first magnetic layer is made to a direction stable to said second magnetic layer while the direction of magnetization of said second magnetic layer is kept unchanged; and
in said second type of recording, a light beam having a power large enough to heat said recording medium to a vicinity of a curie point of said second magnetic layer being irradiated while a bias of the opposite direction is applied, so that the magnetization of said second magnetic layer is reversed and said first magnetic layer is magnetized in a direction stable to said second magnetic layer.

11. A recording method according to claim 10, wherein the application direction of said second magnetic field assists inverting the magnetization of said second magnetic layer.

12. A magneto-optical recording medium comprising
(a) a substrate;
(b) a first magnetic layer formed on said substrate, said first magnetic layer consisting mainly of rare earth element-transition metal amorphous alloy;
(c) a second magnetic layer formed on said substrate, said second magnetic layer consisting of rare earth element-transition metal amorphous alloy to which is added an element that does not show ferromagnetism at room temperature and which effects reducing exchange force acting on the second magnetic layer through magnetic walls by the first and second magnetic layers, said second magnetic layer having a higher curie point and a lower coercive force than said first magnetic layer, and said second magnetic layer being exchange-coupled to said first magnetic layer and
the exchange-couple force between said first and second magnetic layers being smaller than the coercive forces of said first and second magnetic layers at room temperature.

13. A magneto-optical recording medium according to claim 12, wherein said element is one or more of element selected from a group consisting of Cu, Ag, Ti, Mn, B, Pt, Si, Ge, Cr and Al.

14. A magneto-optical recording medium according to claim 13, wherein the amount of said element is 2–70 atomic % to that of said second magnetic layer.

15. A magneto-optical recording medium according to claim 14, wherein the amount of said element is 5–20 atomic % to that of said second magnetic layer.

16. A magneto-optical recording medium according to claim 12, wherein said first magnetic layer and said second magnetic layer each is an alloy selected from a group consisting of GdCo, GdFe, TbFe, DyFe, GdTbFe, TbDyFe, TbFeCo, GdTbCo and GdFeCo.

17. A magneto-optical recording medium according to claim 12, wherein said second magnetic layer is formed by simultaneously evaporation-depositing rare earth element-transition metal material and non-magnetic element material from separately spaced respective evaporation sources.

18. A magneto-optical recording medium according to claim 12, wherein said first magnetic layer has a curie point of 70°–18020 C. and said second magnetic layer has a curie point of 100°–400° C.

19. A magneto-optical recording medium according to claim 12, wherein said first magnetic layer has a coercive force of 3–10K Oe, and said second magnetic layer has a coercive force of 0.5–2K Oe.

20. A method of recording information comprising the steps of:
providing a magneto-optical recording medium having
(1) a substrate;
(2) a first magnetic layer formed on the substrate and consisting mainly of a rare earth element-transition metal amorphous alloy; and
(3) a second magnetic layer formed on the substrate and consisting of a rare earth element-transition metal amorphous alloy with an addition of an element which does not exhibit ferromagnetism at room temperature and which effects reducing exchange force acting on the second magnetic layer through magnetic walls by the first and second magnetic layers;

wherein the second magnetic layer has a higher curie point than the first magnetic layer and a lower coercive force at room temperature than that first magnetic layer, the second magnetic layer is exchange-coupled to the first magnetic layer, and the exchange-couple force between the first and second magnetic layers is smaller than the coercive forces of the first and second magnetic layers at room temperature, applying a first magnetic field large enough to magnetize said second magnetic layer in one direction but not large enough to effect reverse magnetization of said first magnetic layer, and selectively effecting a first type of recording or a second type of recording, depending on an information signal;

in said first type of recording, irradiating with a light beam having a power large enough to heat said recording medium to the vicinity of a curie point of said first magnetic layer, while a second magnetic field is applied as a bias magnetic field, so that the magnetization of said first magnetic layer is made to a direction that is stable with respect to said second magnetic layer, while the direction of magnetization of said second magnetic layer is kept unchanged; and in said second type of recording, irradiating with a light beam having a power large enough to heat said recording medium to the vicinity of a curie point of said second magnetic layer, while a bias of the opposite direction is applied, so that the magnetization of said second magnetic layer is reversed, and said first magnetic layer is magnetized in a direction that is stable with respect to said second magnetic layer.

* * * * *

UNITED STATES PATENT AND TRADEMARK OFFICE
CERTIFICATE OF CORRECTION

PATENT NO. : 5,265,073
DATED : November 23, 1993
INVENTOR(S) : YOICHI OSATO

It is certified that error appears in the above-indentified patent and that said Letters Patent is hereby corrected as shown below:

COLUMN 1

Line 47, "No. 3,619,618" should read --No. 3619618)--.

COLUMN 2

Line 45, "a" should be deleted.

COLUMN 3

Line 1, "point 3" should read --point $T_L$--;
Line 21, "magneto optical" should read --magneto-optical--; and
Line 59, "actual" should read --actuality--.

COLUMN 4

Line 6, "affects to" should read --affects--; and
Line 9, "and etc." should read --, etc.--.

COLUMN 5

Line 4, "layer." should read --layer 3.--; and
Line 59, "magnetude" should read --magnitude--.

COLUMN 7

Line 1, "TbFeCuCo" should read --TbFeCoCu--; and
Line 66, "indicate" should read --indicates--.

UNITED STATES PATENT AND TRADEMARK OFFICE
CERTIFICATE OF CORRECTION

PATENT NO. : 5,265,073
DATED : November 23, 1993
INVENTOR(S) : YOICHI OSATO

It is certified that error appears in the above-indentified patent and that said Letters Patent is hereby corrected as shown below:

COLUMN 8

Line 3, "45" should read --4f--; and
Line 63, "bounded" should read --bonded--.

COLUMN 9

Line 31, "sample" should read --samples--; and
Line 61, "samples 4-4," should read --samples 4-4,--.

COLUMN 10

Line 2, "claim." should read --the claims.--; and
Line 21, "layer" should read --layers--.

COLUMN 11

Line 30, "second" should read --said second--.

COLUMN 12

Line 7, "comprising" should read --comprising:--;
Line 23, "layer and" should read --layer, and--; and
Line 51, "70°-18020 C." should read --70°-180° C.--.

UNITED STATES PATENT AND TRADEMARK OFFICE
CERTIFICATE OF CORRECTION

PATENT NO. : 5,265,073
DATED : November 23, 1993
INVENTOR(S) : YOICHI OSATO

It is certified that error appears in the above-indentified patent and that said Letters Patent is hereby corrected as shown below:

COLUMN 13

Line 8, "that" should read --the--.

Signed and Sealed this

Twentieth Day of September, 1994

Attest:

BRUCE LEHMAN

Attesting Officer

Commissioner of Patents and Trademarks